United States Patent
Miyamoto et al.

(10) Patent No.: US 7,964,239 B2
(45) Date of Patent: Jun. 21, 2011

(54) BEARING MATERIAL COATED SLIDE MEMBER AND METHOD FOR MANUFACTURING THE SAME

(75) Inventors: Noritaka Miyamoto, Toyota (JP); Masaki Hirano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1283 days.

(21) Appl. No.: 11/482,059

(22) Filed: Jul. 7, 2006

(65) Prior Publication Data

US 2007/0009756 A1    Jan. 11, 2007

(30) Foreign Application Priority Data

Jul. 8, 2005    (JP) ................................. 2005-200378

(51) Int. Cl.
  *F16C 32/00*    (2006.01)
(52) U.S. Cl. ......... 427/180; 427/201; 384/907; 384/912
(58) Field of Classification Search ........................ None
  See application file for complete search history.

(56) References Cited

U.S. PATENT DOCUMENTS

| | | | | |
|---|---|---|---|---|
| 4,941,914 A | * | 7/1990 | Craig et al. ...................... | 75/309 |
| 5,326,384 A | * | 7/1994 | Asada et al. ...................... | 75/231 |
| 5,362,574 A | | 11/1994 | Tanaka et al. | |
| 5,384,205 A | * | 1/1995 | Tanaka et al. .................. | 428/643 |
| 5,434,012 A | * | 7/1995 | Tanaka et al. .................. | 428/643 |
| 5,551,782 A | | 9/1996 | Arnhold et al. | |
| 5,864,748 A | * | 1/1999 | Dail .............................. | 725/126 |
| 5,875,702 A | * | 3/1999 | Kawagoe et al. ............... | 92/12.2 |
| 6,234,678 B1 | | 5/2001 | Tsuji et al. | |
| 6,334,914 B2 | | 1/2002 | Sakai et al. | |
| 6,379,754 B1 | * | 4/2002 | Schlegel et al. ................ | 427/446 |
| 6,416,877 B1 | | 7/2002 | Perrin et al. | |
| 2002/0026855 A1 | | 3/2002 | Sakai et al. | |
| 2002/0033161 A1 | * | 3/2002 | Hoffmann et al. ......... | 123/195 R |
| 2005/0221110 A1 | * | 10/2005 | Fujita et al. .................... | 428/653 |
| 2007/0042218 A1 | | 2/2007 | Lang | |

FOREIGN PATENT DOCUMENTS

| | | |
|---|---|---|
| DE | 763645 | 8/1936 |
| DE | 10 2004 043 914 A1 | 3/2006 |
| EP | 1 445 033 A1 | 8/2004 |
| JP | 11-182549 | 7/1991 |
| JP | 5-302626 | 11/1993 |
| JP | 06-025821 | * 2/1994 |
| JP | 10-121166 | * 5/1998 |

(Continued)

OTHER PUBLICATIONS

Office Action from the German Patent Office for Appl. No. 10 2006 031 043.8-45 dated Jun. 30, 2010.

(Continued)

*Primary Examiner* — Jennifer C McNeil
*Assistant Examiner* — Jason L Savage
(74) *Attorney, Agent, or Firm* — Finnegan, Henderson, Farabow, Garrett & Dunner, LLP

(57) ABSTRACT

The present invention provides a bearing material coated slide member manufactured by coating a bearing material on a sliding surface of a slide member, and a method for manufacturing the same, in which the bearing material is composed of an Sn containing alloy powder, and is forced to impact on the sliding surface while being maintained in a solid phase, to thereby form a bearing material coated layer.

7 Claims, 12 Drawing Sheets

FOREIGN PATENT DOCUMENTS

| | | |
|---|---|---|
| JP | 2001-115248 | 4/2001 |
| JP | 2002-38235 | 2/2002 |
| JP | 2002-506926 | 3/2002 |
| JP | 2002-161371 | 6/2002 |
| JP | 2003-156046 | 5/2003 |
| JP | 2005-179707 | 7/2005 |
| WO | WO 94/18463 | 8/1994 |
| WO | WO 2005/033353 A2 | 4/2005 |

OTHER PUBLICATIONS

Notice of Grounds for Rejection for JP Application No. 2005-200378 dated Apr. 19, 2011.

* cited by examiner

Fig. 7C
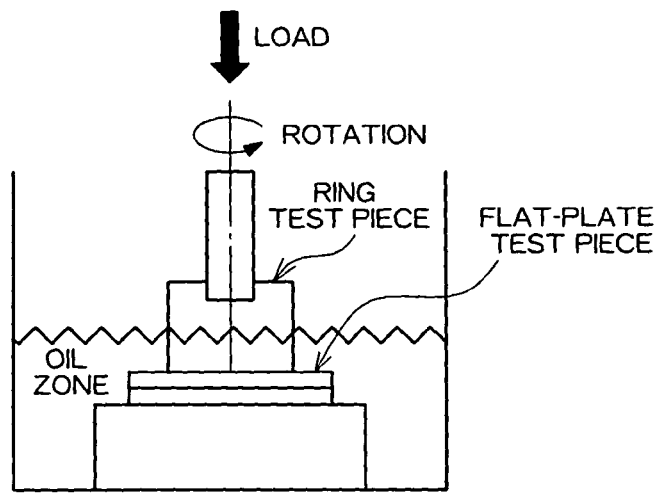
Fig. 7D
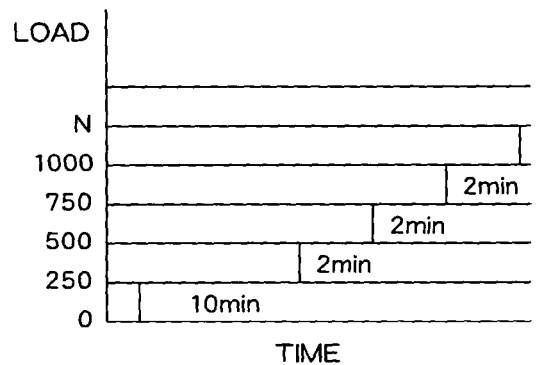
Fig. 7E
| REVOLUTIONS PER MINUTE | 1000rpm |
|---|---|
| LOAD | +250N/2min (MAX5000N) |
| TEMPERATURE | R.T. |
| n NUMBER | 2 |
| RUNNING IN | 1000rpm*250N *10min |

BEARING MATERIAL COATED SLIDE MEMBER AND METHOD FOR MANUFACTURING THE SAME

The entire disclosure of Japanese Patent Application No. 2005-200378 including specification, claims, drawings and abstract is incorporated herein by reference in its entirety.

BACKGROUND OF THE INVENTION

1. Field of the Invention

The present invention relates to a method for manufacturing a bearing material coated slide member and to the bearing material coated slide member, and more particularly to a method for manufacturing a bearing material coated slide member in which a bearing material is coated on a sliding surface of a slide member and to the bearing material coated slide member manufactured by the method.

2. Description of the Related Art

A sliding surface of a slide member, such as a connecting rod used for a vehicle engine, is provided with a bearing, such as a sleeve bearing, to reduce friction between the sliding surface and a shaft acting as a rotation axis, thereby enhancing lubricity to improve the sliding property of the sliding surface. As a bearing material used for forming the bearing, a so-called white metal, such as an Sn—Sb—Cu alloy or a Pb—Sn—Sb alloy, a Cu—Pb alloy, a tin bronze, a lead bronze, an aluminum alloy, or the like is used. Because the alloys are generally soft materials, the alloys exhibit properties such as anti-seizing, fitting to a shaft, and the like. Such bearings are typically manufactured by casting or sintering one or more of the above-described alloys, and are used in a state in which the bearings are fitted into the sliding surface of the slide member.

FIG. 11 schematically shows a metallographic structure of a bearing composed of an Al—Sn—Si alloy, which is an example of aluminum alloys manufactured by casting and subsequent rolling of a material. The metallographic structure of the Al—Sn—Si alloy exhibits an organization in which Sn is finely dispersed in a base material of Al. Such fine dispersion of Sn imparts anti-seizing and other properties to the bearing. In addition, the metallographic structure of the Al—Sn—Si alloy exhibits uniform precipitation of Si. The uniformly precipitated Si grinds a shaft which is an object to be fitted, which yields improvement in wear resistance of the bearing while strengthening the property of preventing the bearing from seizing to the shaft.

In addition to the above-described casting and sintering, methods for directly forming a coating for use in bearing on a sliding surface of a slide member are employed for manufacturing a bearing. Methods for directly forming the bearing on the sliding surface of the slide member includes physical vapor deposition (PVD), thermal spraying, and others. PVD is a method for evaporating a metallic material, a ceramic material, or the like to physically coat the evaporated metallic material on a base material, and the method includes ion plating, sputtering, and vacuum evaporation. PVD is advantageous in that it provides a capability of forming an elaborate coating on a sliding surface of a slide member, but has a disadvantage in that productivity is relatively low due to the slow deposition rate in formation of the coating. Accordingly, PVD is not suited to mass production. Further, because a coating formed by PVD generally has a high hardness, use of the coating can lead to deterioration of anti-seizing property due to the hardness of the coating.

Thermal spraying is a method in which a thermal spray material, such as a metallic material or a ceramic material, is fused and sprayed onto a base material by means of high pressure gas to form a coating. Thermal spraying includes oxy-fuel spraying, such as flame spraying in which a thermal spray material fused in a high-temperature combustion gas is sprayed, and electric spraying, such as plasma spraying in which the thermal spray material fused in a plasma jet is sprayed. Because, in the thermal spraying, a metallic material, a ceramic material, or the like is fused to form a bearing on a sliding surface of a slide member, a deposition rate in formation of coating by the thermal spraying is advantageously faster than that using the PVD method. Accordingly, thermal spraying is generally employed when the bearing is directly formed on the sliding surface of the slide member.

FIG. 12 schematically shows a metallographic structure of an Al—Sn—Si alloy powder being a thermal spray material used for manufacturing a bearing composed of an Al—Sn—Si alloy by thermal spraying. Si exhibits a structure dissolved in Al, whereas Sn exhibits a structure finely dispersed in an Al—Si solid solution because Sn is hardly solved in Al. FIG. 13 schematically shows a metallographic structure of a coating for use in bearing of the Al—Sn—Si alloy formed using an Al—Sn—Si alloy powder by thermal spraying. In FIG. 13, Sn segregated portions resulting from thermal spraying of the fused Al—Sn—Si alloy powder are observed in the metallographic structure. Further, oxides generated through oxidation of the Al—Sn—Si alloy powder are also found in the structure. Such oxide generation occurs because thermal spraying is generally performed while the surface is exposed to the air.

In formation of a bearing coating by means of thermal spraying as described above, because the alloy powder being the thermal spray material is fused to form a coating on the sliding surface of the slide member, low-melting components having been finely dispersed in the alloy powder before thermal spraying, such as Sn or Pb, are segregated while forming a continuous structure during solidification of the fused alloy powder deposited on the sliding surface. The segregated structure has a relatively low mechanical strength due to components of soft metals, such as Sn or Pb, which in turn reduces the strength as the bearing, in particular, causing degradation in fatigue strength when repeated loading is imposed. Further, because thermal spraying is performed in an ordinary atmosphere as noted above, the thermal spray material can undergo oxidation, leading to generation of oxides. In the presence of the oxides generated from the thermal spray material due to oxidation, a section including the oxides is very likely to emerge as a starting point of fatigue failure due to hardness properties of the oxides, which raises a problem in that fatigue performance of the bearing is lowered.

SUMMARY OF THE INVENTION

Therefore, the present invention advantageously disperses components used for improving an anti-seizing property, such as Sn or Pb, on a bearing coating formed as a bearing.

The present invention provides a method for manufacturing a bearing material coated slide member in which a bearing material is coated on a sliding surface of a slide member. The method for manufacturing a bearing material coated slide member comprises a bearing member coating step of forcing the bearing material to impact on the sliding surface in a state where the bearing material is in a solid phase to form a bearing material coated layer, and the bearing material comprises an Sn containing alloy powder. With this method, Sn can be dispersed in the bearing material coated layer, to thereby improve an anti-seizing property of the sliding surface.

In the method for manufacturing a bearing material coated slide member according to the present invention, the Sn containing alloy power may preferably be an Al alloy powder which contains 4 wt % to 16 wt % of Sn, or a Cu alloy powder which contains 2 wt % to 10 wt % of Sn. More preferably, the Sn containing alloy powder may be an Al alloy powder which contains from 8 wt % to 16 wt % of Sn, or a Cu alloy powder which contains from 5 wt % to 10 wt % of Sn. Use of the Al alloy powder or the Cu alloy powder containing Sn which is of a composition as described above can yield further improvement in anti-seizing property of the sliding surface.

In the method for manufacturing a bearing material coated slide member according to the present invention, it may be preferable that the bearing material includes a predetermined hard material. The inclusion of the predetermined hard material in the bearing material can also provide improvement in property of the sliding surface, such as the anti-seizing property or wear resistance. It is further preferable that the predetermined hard material be at least one of materials selected from a group of $Al_2O_3$, SiC, AlN, Fe—C, $Mo_2C$, Ni—B, Fe—Mo, and Fe—P, and a preferable content of the predetermined hard material is from 2 wt % to 10 wt %.

In the bearing material coated slide member according to the present invention manufactured by coating a bearing material on a sliding surface of a slide member, the bearing material is caused, in a solid phase, to impact on the sliding surface to form a bearing material coated layer, and is prepared so as to include an alloy powder which contains Sn. Because Sn can be dispersed in the bearing material coated layer, the anti-seizing property and other properties can be improved.

Further, in the bearing material coated slide member according to the present invention, the Sn containing alloy powder may preferably be an Al alloy powder which contains from 4 wt % to 16 wt % of Sn, or a Cu alloy powder which contains from 2 wt % to 10 wt % of Sn. More preferably, the Sn containing alloy powder may be an Al alloy powder which contains from 8 wt % to 16 wt % of Sn, or a Cu alloy powder which contains from 5 wt % to 10 wt % of Sn. The use of the Al alloy powder or the Cu alloy powder containing Sn which is of a composition as described above can yield further improvement in anti-seizing property of the sliding surface.

In the bearing material coated slide member according to the present invention, it may be preferable that the bearing material includes a predetermined hard material. The inclusion of the predetermined hard material in the bearing material can also provide improvement in property of the sliding surface, such as the anti-seizing property or wear resistance. It is further preferable that the predetermined hard material be at least one of materials selected from a group of $Al_2O_3$, SiC, AlN, Fe—C, $Mo_2C$, Ni—B, Fe—Mo, and Fe—P, and a preferable content of the predetermined hard material is from 2 wt % to 10 wt %.

BRIEF DESCRIPTION OF THE DRAWINGS

Preferred embodiments of the present invention will be described in detail based on the following figures, wherein:

FIG. 7C is a schematic diagram outlining the seizure test conducted in accordance with the method specified by the mechanical test laboratory;

FIG. 7D is a schematic diagram showing a load application method used in conjunction with the seizure test conducted in accordance with the method specified by the mechanical test laboratory;

FIG. 7E is a diagram showing test conditions of a the seizure test conducted in accordance with the method specified by the mechanical test laboratory;

DESCRIPTION OF THE PREFERRED EMBODIMENTS

Figure 1:
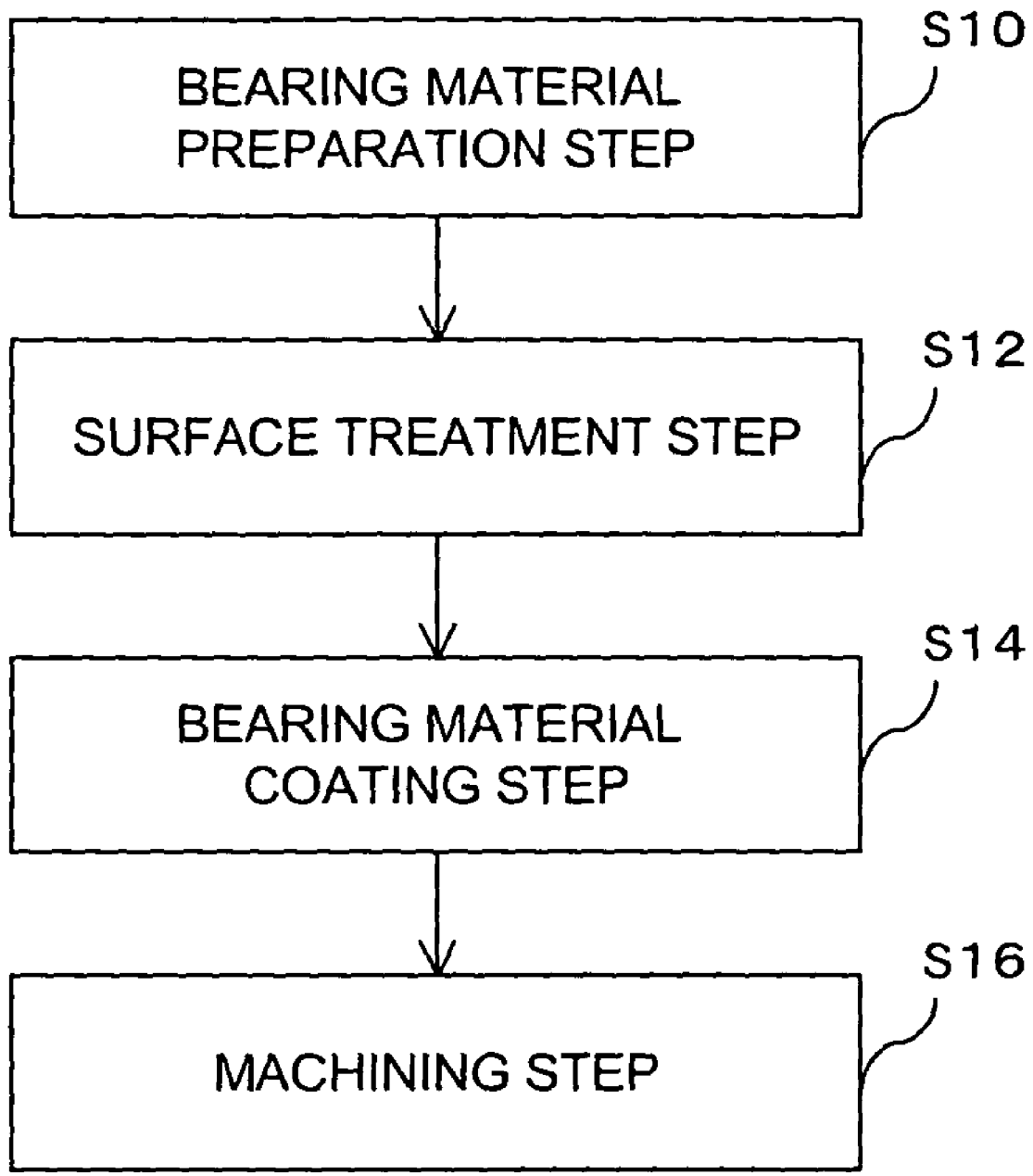
FIG. 1 shows process steps of a method for manufacturing a bearing material coated slide member according to an embodiment of the present invention.

Referring now to the drawings, preferred embodiments of the present invention will be described below.

FIG. 1 is a diagram showing process steps in a method for manufacturing a bearing material coated slide member.

In a bearing material preparation step (S10), a metal powder to be used as a bearing material is prepared. As such a metal powder of the bearing material, an alloy powder containing at least one of alloy components, such as Sn, Pb, or Bi, provided for imparting lubricity to prevent occurrence of seizing between a bearing and a shaft is used. The alloy components, such as Sn, Pb, and Bi, are metallic materials having softness and are capable of improving a fit between the bearing and the shaft, fatigue performance, or other properties.

For manufacturing the alloy powder, a gas atomizing method is used. Alloy powders manufactured by gas atomizing are noted for having a low content of oxides in the alloy powder. Gas atomizing is a method for spraying a fused metal by means of a gas injected from a nozzle, to thereby manufacture an alloy powder. Here, as the gas to be injected from the nozzle, a nitrogen gas, air, or an inert gas, such as helium or argon, may be used. It will be understood by a person skilled in the art that the method for manufacturing an alloy powder is not limited to gas atomizing, and the alloy powder may be manufactured using a mechanical manufacturing method, such as pulverization, an electrolysis manufacturing method, a chemical manufacturing method using chemical reaction, such as reduction of oxide or pyrolysis, or a water atomizing method for manufacturing an alloy powder from a fused metal by means of injection of high-pressure water.

Among alloy powders containing at least one alloy component, such as Sn, Pb, or Bi, an alloy powder containing Sn may be an Al alloy powder containing Sn or a Cu alloy powder containing Sn. Al and Cu alloy powders are noted for their preferable wear resistance and corrosion resistance. It is to be understood that the Sn-containing alloy powder may additionally include Zn, Cr, Ag, Al (for a Cu bearing), Cu (for an Al bearing), or the like in a bearing alloy defined by JIS (Japanese Industrial Standards) or SAE (Society of Automotive Engineers), and the Sn-containing alloy powder is not limited to those listed above. The Sn content in the Al alloy powder containing Sn or the Cu alloy powder containing Sn may be determined in accordance with film deposition performance while coating the bearing material on a sliding surface of the slide member or a property of preventing occurrence of seizing to a shaft. It is preferable that the Sn content in the Sn-containing Al alloy powder be from 4 wt % to 16 wt %, and more preferably, from 8 wt % to 16 wt %, and that the Al content in the Sn-containing Al alloy powder be from 84 wt % to 96 wt % of Al. When the Sn content is less than 4 wt %, sufficient anti-seizing effect cannot be provided. On the other hand, when the Sn content exceeds 16 wt %, the anti-seizing property is deteriorated.

In the Cu alloy powder containing Sn, a preferable Sn content is from 2 wt % to 10 wt %, and more preferably, from 5 wt % to 10 wt %. An Sn content less than 2 wt % cannot yield sufficient effects of the anti-seizing property, whereas an Sn content greater than 10 wt % results in degradation of the anti-seizing property.

The particle size of the Sn-containing alloy powder is preferably 53 μm or smaller. Coating of the alloy powder being the bearing material on the sliding surface of the slide member is difficult when the Sn-containing alloy powder has a greater particle size. However, the particle size of the alloy powder containing Sn is not limited to the above-specified range, and may be specified to a different size depending on conditions.

An alloy powder containing Pb may be an Al alloy powder or a Cu alloy powder containing Pb, but is not limited to these alloy powders. The Pb content in the Al alloy powder containing Pb or the Cu alloy powder containing Pb may be determined in accordance with film deposition performance while coating the alloy powder and others being the bearing material on a sliding surface of the slide member or the property of preventing occurrence of seizing to a shaft. A preferable Pb content in the Pb containing Al alloy powder is 4 wt % or less, and more preferably, 2 wt % or less. The Pb content is thus specified to 4 wt % or less because a Pb content greater than 4 wt % results in degradation of the anti-seizing property.

The Pb content in the Pb-containing Cu alloy powder is preferably 25 wt % or less, and more preferably, 15 wt % or less. Because a Pb content greater than 25 wt % results in degradation of the anti-seizing property, a Pb content of 25 wt % or less is specified.

The Pb-containing alloy powder preferably has a particle size of 53 μm or smaller. If the particle size is greater, coating of the bearing material on the sliding surface of the slide member becomes difficult. However, the particle size of the alloy powder containing Pb is not limited to the above-specified range, and may be specified to a different size in consideration of other conditions.

Further, a material which is harder than the alloy powder containing Sn or Pb may be added to the alloy powder used for the bearing material as a predetermined hard material in order to improve fatigue performance, properties related to preventing occurrence of seizing onto a shaft, or wear resistance of the bearing. As the hard material, a powder of $Al_2O_3$, SiC, AlN, Fe—C, $Mo_2C$, Ni—B, Fe—Mo, or Fe—P, and the like may be used. It is to be understood that the hard material is not limited to those listed above, and a ceramic material, such as an oxide, a carbide, a boride, or a nitride, or a metallic material, such as an intermetallic compound or a quenched Fe alloy, may be used as the hard material. A powder of the above-described ceramic material may be prepared by a gas phase synthesis method in which the powder is synthesized in a gas phase, such as gas phase chemical reaction; a liquid phase synthesis method, such as precipitation; or a solid phase synthesis method, such as pyrolysis. A powder of the intermetallic compound, on the other hand, may be prepared by gas atomizing as described above. The particle size of the hard material is preferably from 2 μm to 30 μm, but is not limited to this range. A particle size other than those described above may be used in consideration of other conditions.

An addition amount of the hard material in the alloy powder used as the bearing material may be determined in consideration of desired fatigue performance, properties related to preventing occurrence of seizing to a shaft, or wear resistance of the bearing. As the addition amount of the hard material, amounts of from 2 wt % to 10 wt % are preferable. Because fatigue performance, properties related to preventing occurrence of seizing to a shaft, and wear resistance are insufficient when the amount of the hard material is less than 2 wt %, the addition amount of the hard material should be 2 wt % or greater. On the other hand, an addition amount greater than 10 wt % can cause the hard material to agglomerate, and an area where the hard material agglomerates is likely to be cracked. Because such cracking results in degradation of the fatigue performance, the addition amount should be maintained at 10 wt % or less. Further, when a greater amount of the hard material is added, wear in the bearing caused by the shaft being the object to be fitted becomes more severe, resulting in generation of worn powder which wears off the bearing itself. Consequently, the wear resistance of the bearing is lowered.

Next, in a surface treatment step (S12), the sliding surface of the slide member is roughened to provide more intimate contact between the bearing coating and the sliding surface. As such surface treatment, abrasive blasting, for example, may be employed. Abrasive blasting is a type of processing involving the spraying of an abrasive material composed of a metallic material or a non-metallic material onto the sliding surface for surface roughening. Here, a metallic material, such as steel, or a non-metallic material, such as alumina or silicon carbide, for example, may be used as the abrasive material, but the abrasive material is not limited to these materials. For example, the above-described hard material may be utilized as the abrasive material. In addition to roughening of the sliding surface, removal of substances adhering on the sliding surface can be performed through the abrasive blasting. Abrasive blasting techniques include, for example, air blasting, shot blasting, or the like.

Then, in a bearing material coating step (S14), the bearing material is forced to impact on the sliding surface while being maintained in a solid phase in order to form a bearing material coated layer. Here, the bearing material of the Sn containing alloy powder or the Pb containing alloy powder is coated in the state of the solid phase because segregation and other reaction which might occur due to reprecipitation of the alloy component of Sn or Pb contained in the alloy powder can be prevented by supplying and coating the unfused alloy powder in the solid phase. Further, coating of the solid-phase alloy powder of the bearing material can be performed at a temperature lower than that required for coating the alloy powder in a fused state, thereby yielding an effect that generation of oxide due to oxidation of the alloy powder can be suppressed.

To coat the sliding surface, the bearing material is impelled against the sliding surface with the goal of forcing the alloy powder of the bearing material to deform due to the impact energy obtained through high-speed collision of the bearing material with the sliding surface, and to thereby enhance the intimacy of the contact between the sliding surface and the bearing material for coating. Here, in terms of enhancing the contact between the bearing material and the sliding surface, a preferable velocity of collision of the alloy powder of the bearing material with the sliding surface is from approximately Mach 1.5 to approximately Mach 3.0 (from 500 m/sec to 1,050 m/sec), although it is, of course, to be understood by a person skilled it the art that the velocity of collision of the alloy powder of the bearing material with the sliding surface is not specifically limited to this range.

A bearing material coating method as described may be implemented by, for example, cold gas dynamic spraying in which a high pressure gas, such as a nitrogen gas, is heated using a heater, and the alloy powder and other powders of the bearing material supplied from a powder feeder are impelled against the sliding surface using the heated high pressure gas so as to coat the sliding surface. As the coating method, for example, the coating method disclosed in Japanese Patent Laid-Open Publication No. 2001-115248 may be used.

Figure 2:
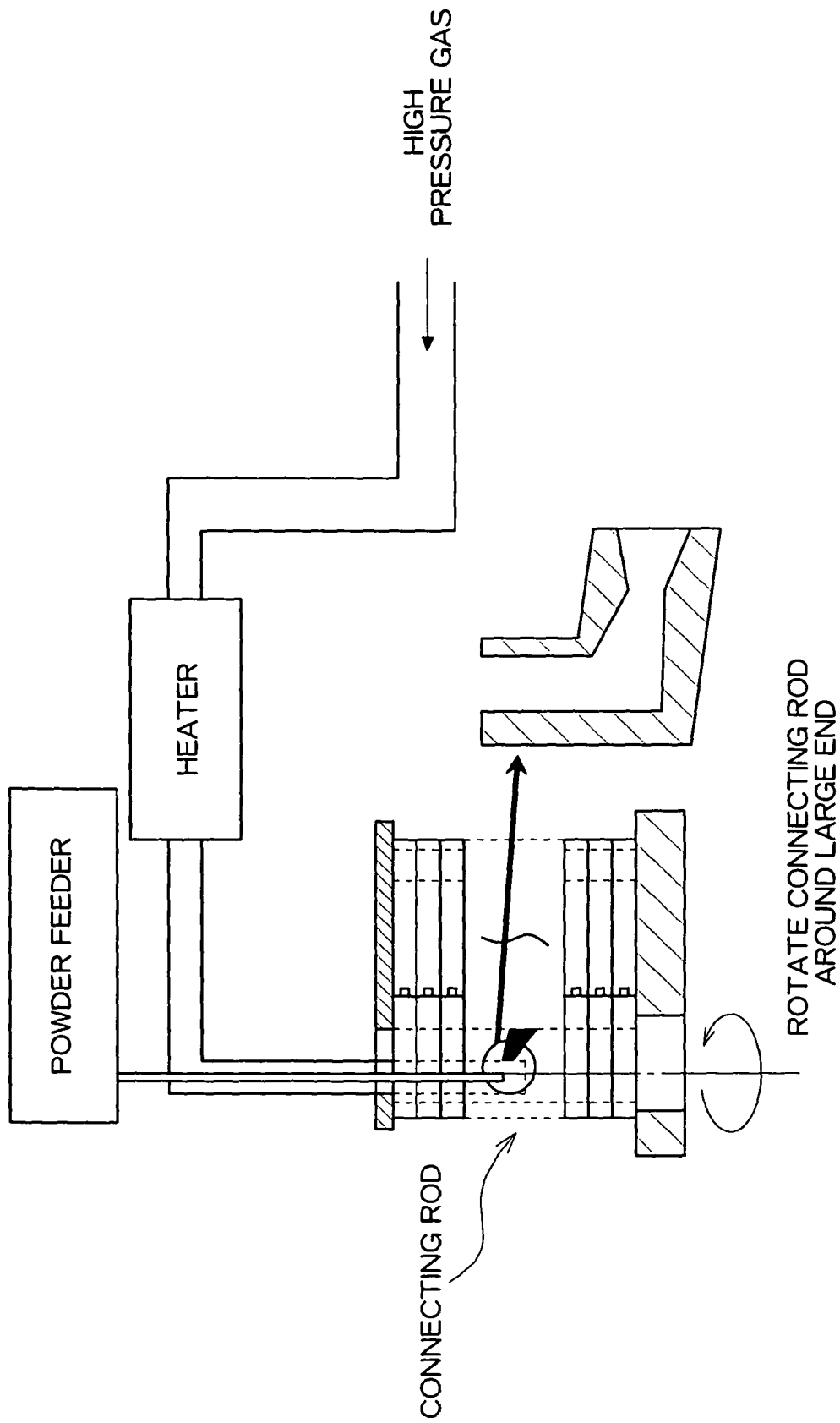
FIG. 2 shows an outline of a bearing material coating apparatus using a cold gas dynamic spraying method according to an embodiment of the present invention.

FIG. 2 schematically shows a bearing material coating apparatus using cold gas dynamic spraying. The bearing material coating apparatus using cold gas dynamic spraying comprises a gas supply unit for supplying a high pressure gas, a heater for heating the high pressure gas, a powder feeder for feeding the alloy powder of the bearing material, and a nozzle for spaying the heated alloy powder onto the sliding surface. A gas to be used may be a nitrogen gas, for example. Further, an inert gas, such as helium or argon, a hydrogen gas, air, or the like may also be used as the gas. A gas pressure is preferably specified to a value at which the alloy powder can impact against the sliding surface at a speed from approximately Mach 1.5 to approximately Mach 3.0 (from 500 m/sec to 1,050 m/sec), and may be specified as, for example, 0.5 MPa. There is, however, no specific limitation to the gas pressure. A gas heating temperature, which may be 400° C., for example, is not limited to any specific value as long as the alloy powder of the bearing material does not melt at that temperature. The alloy powder of the bearing material is introduced from the powder feeder as described below. When an alloy powder containing an additive of a hard material is used as the bearing material, a mixed powder of the hard material and the alloy powder having been mixed previously in a commonly used general mixer or the like may be fed from the powder feeder, or the alloy powder and the hard material may be individually fed from separate powder feeders and then mixed at a predetermined mixture ratio prior to a coating process. Then, as shown in FIG. 2, twelve connecting rods, for example, are subjected to cold gas dynamic spraying using a nitrogen gas compressed to a pressure of 0.5 MPa and heated to a temperature of 400° C.

Figure 3:
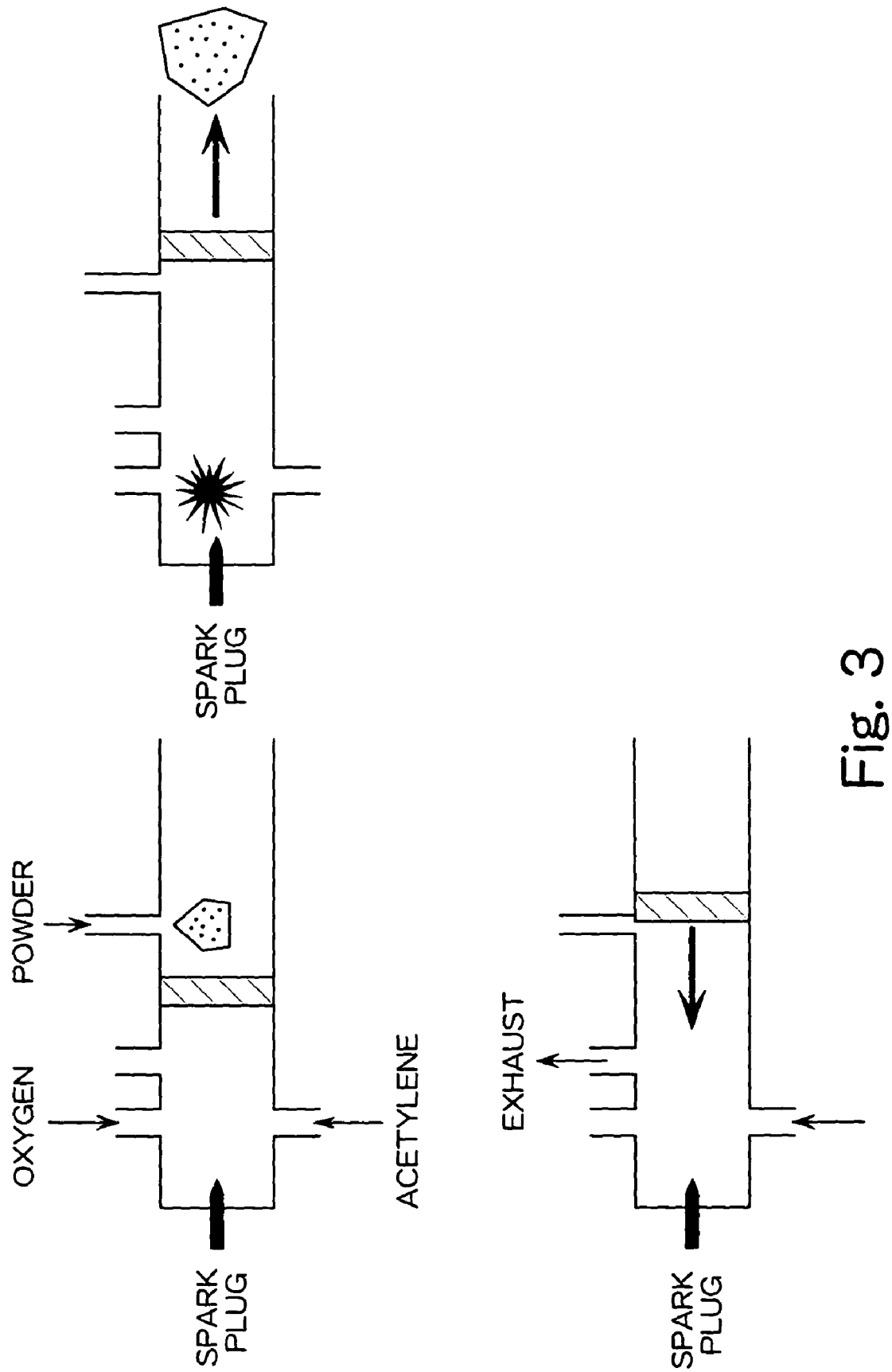
FIG. 3 shows an outline of another bearing material coating apparatus using a detonation spraying method according to an embodiment of the present invention.

The bearing material may be coated on the sliding surface by another coating method, such as a detonation spraying method using detonation flame spraying. FIG. 3 schematically shows another bearing material coating apparatus using the detonation spraying method. The bearing material coating apparatus using the detonation spraying method is implemented by installing a piston used for accelerating the alloy powder of the bearing material in a conventional apparatus for detonation flame spraying. The piston is pushed by igniting a combustion gas composed of an oxygen gas and an acetylene gas, for example, by means of a spark plug. Then, the alloy powder and others of the bearing material are accelerated to a speed of, for example, approximately Mach 2.2 (760 m/sec) by the force of the piston, such that the particles collide against the sliding surface at a high speed. Because the alloy powder is introduced into an area situated on the side of the piston opposite to the volume into which the combustion gas is fed, heat generated by the combustion gas is blocked by the piston, which allows the alloy powder of the bearing material to be coated on the sliding surface in the state of the solid phase. It is to be understood that the bearing material coating method is not limited to the cold gas dynamic spraying and the detonation spraying, and any method may be used for coating the bearing material as long as the bearing material can be coated on the sliding surface while being collided against the sliding surface in the state of the solid phase in the method. The thickness of the bearing material coated layer is preferably 0.4 mm, but is not specifically limited to the value.

Returning to FIG. 1, a machining step (S16) is a process for machining the sliding surface having the alloy powder of the bearing material coated thereon in the bearing material coating step (S14), to form a predetermined thickness of the bearing material coated layer. The machining can be performed using an apparatus commonly used for machining. It is preferable that the bearing material coated layer is formed to be of a thickness of 0.3 mm after the machining. However, the bearing material coated layer is not limited to the thickness. In particular, when the bearing material coated layer is hardened by work hardening or the like, a heat treatment, such as annealing, may be performed on the bearing material coated layer.

Figure 4:
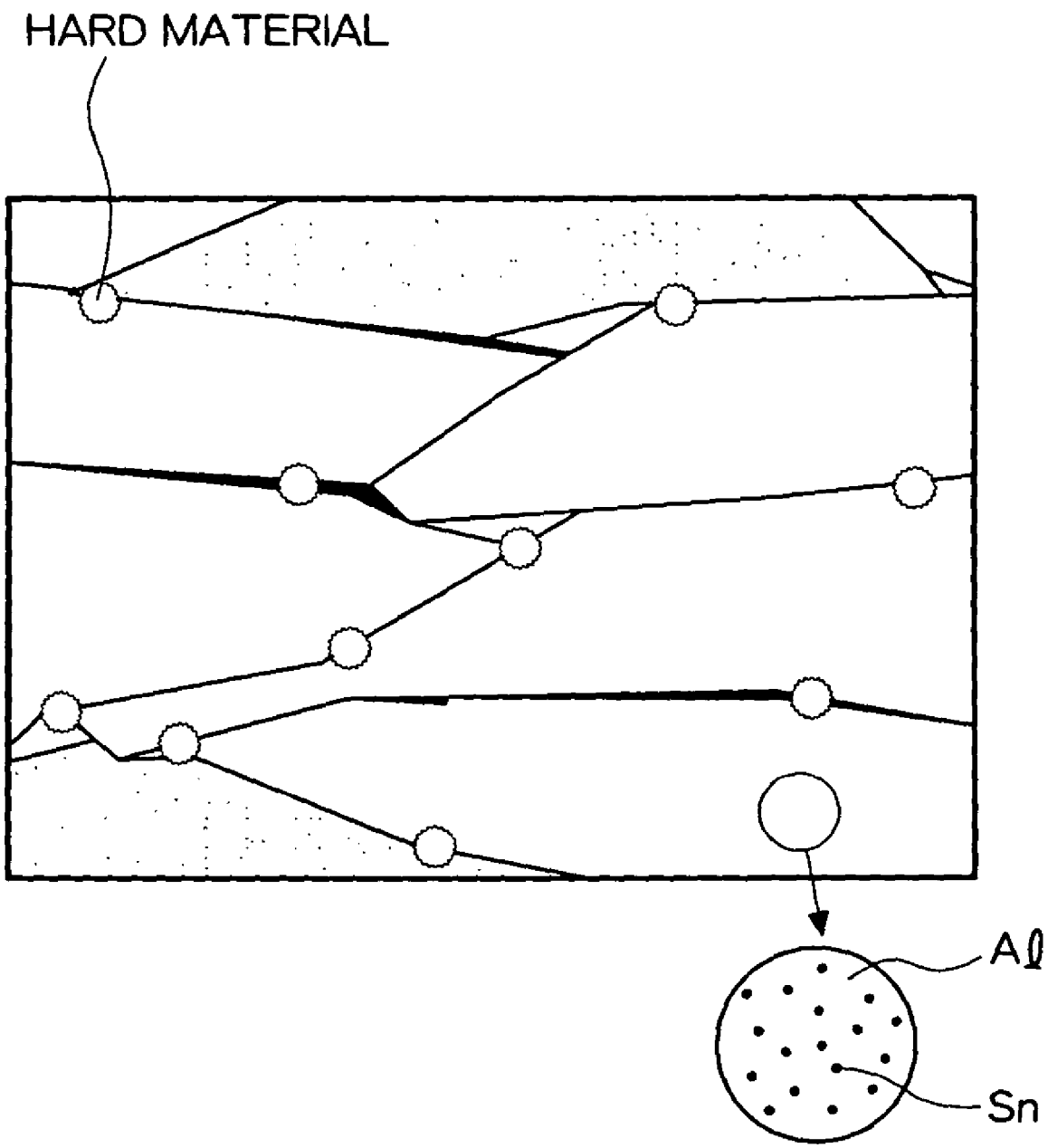
FIG. 4 schematically shows a structure of a bearing material coated layer composed of an Al—Sn alloy manufactured by the method for manufacturing a bearing material coated slide member according to an embodiment of the present invention.

FIG. 4 schematically shows the structure of a bearing material coated layer composed of an Al—Sn alloy fabricated using the method for manufacturing a bearing material coated slide member according to the embodiment of the present invention. Because, in the illustrated structure, an Al—Sn alloy powder of the bearing material is coated in a state in which it is maintained in the solid phase on the sliding surface without melting, the coating is formed while avoiding segregation of Sn, which is an alloy component. Further, in this structure, the hard material added to the Al—Si alloy powder is dispersed in the coating. Thus, because the Sn of the alloy component used for imparting the anti-seizing property has been dispersed even after the formation of the bearing material coated layer, the anti-seizing property given to the coating is properly maintained. Further, non-segregated Sn contributes to improvement in fatigue performance of the bearing. In addition, the hard material is also dispersed throughout the coating, thereby providing further improvement in the fatigue performance, the property of preventing occurrence of seizing to the shaft, or wear resistance of the bearing. Because the bearing material coated layer can be formed at a temperature lower than that used for thermal spraying, generation of the oxides which are likely to create a starting point for fatigue failure can be prevented.

As described above, direct formation of the bearing comprising the bearing material coated layer on the sliding surface of the slide member contributes to, for example, reduction of the number of components required in a vehicle, which in turn allows a manufacturer to take steps to reduce the number of fabrication steps in the bearing assembly process. Further, because the bearing is directly formed on the sliding surface of the slide member, it is possible to reduce the weight of the components. Regarding a connecting rod for a vehicle, for example, the thickness of the bearing can be thinned from approximately 1.5 mm to approximately 0.3 mm at the large end of the connecting rod, thereby enabling reduction of the weight of the connecting rod.

EXAMPLE 1

A Cu alloy powder containing Sn and an Fe—P powder used as a hard material were prepared in the bearing material preparation step (S10). Specifically, a Cu—Sn—Ag alloy powder containing 8 wt % of Sn and 1 wt % of Ag was used for the Sn containing Cu alloy powder. The Cu—Sn—Ag alloy powder was manufactured by the gas atomizing method using a nitrogen gas, and adjusted to be of a grain size of from 10 μm to 45 μm. The Fe—P powder was adjusted to be of a grain size of from 5 μm to 20 μm. Then, 95 wt % of the Cu—Sn—Ag alloy powder and 5 wt % of the Fe—P powder were mixed, and the resulting mixture was used as the bearing material.

A molded connecting rod having an internal diameter of 48 mm at a large end thereof was used as the slide member. In the bearing material coating step (S14), the bearing material was coated on the sliding surface by means of the above-described cold gas dynamic spraying while rotating 12 molded connecting rods stacked on top of each other. The cold gas dynamic spraying was performed on the condition of using a nitrogen gas compressed to a gas pressure of 0.5 MPa as the high-pressure gas. Further, the gas heating temperature was set to 400° C. in a heater. In the machining step (S16), the bearing material coated layer having a 0.4 mm thickness before machining was thinned to a thickness of 0.3 mm. The Vickers hardness of the machined bearing material coated layer was HV100.

EXAMPLE 2

An Al alloy powder containing Sn and an $Al_2O_3$ powder used as a hard material were prepared in the bearing material preparation step (S10). Specifically, an Al—Sn alloy powder containing 12 wt % of Sn was used for the Sn containing Al alloy powder. The Al—Sn alloy powder was manufactured by the gas atomizing method using a nitrogen gas, and adjusted to be of a grain size of from 10 μm to 45 μm. The $Al_2O_3$ powder was adjusted to be of a grain size of from 2 μm to 5 μm. Then, 95 wt % of the Al—Sn alloy powder and 5 wt % of the $Al_2O_3$ powder were mixed, and the resulting mixture was used as the bearing material.

A molded connecting rod having an internal diameter of 48 mm at a large end thereof was used as the slide member. In the bearing material coating step (S14), the bearing material was coated on the sliding surface by means of the above-described cold gas dynamic spraying while rotating 12 molded connecting rods stacked on top of each other. The cold gas dynamic spraying was performed on the condition of using a nitrogen gas compressed to a gas pressure of 0.5 MPa as the high-pressure gas. Further, the gas heating temperature was set to 400° C. in a heater. In the machining step (S16), the bearing material coated layer having a 0.4 mm thickness before machining was thinned to a thickness of 0.3 mm. The Vickers hardness of the machined bearing material coated layer was HV80.

EXAMPLE 3

Figure 5:
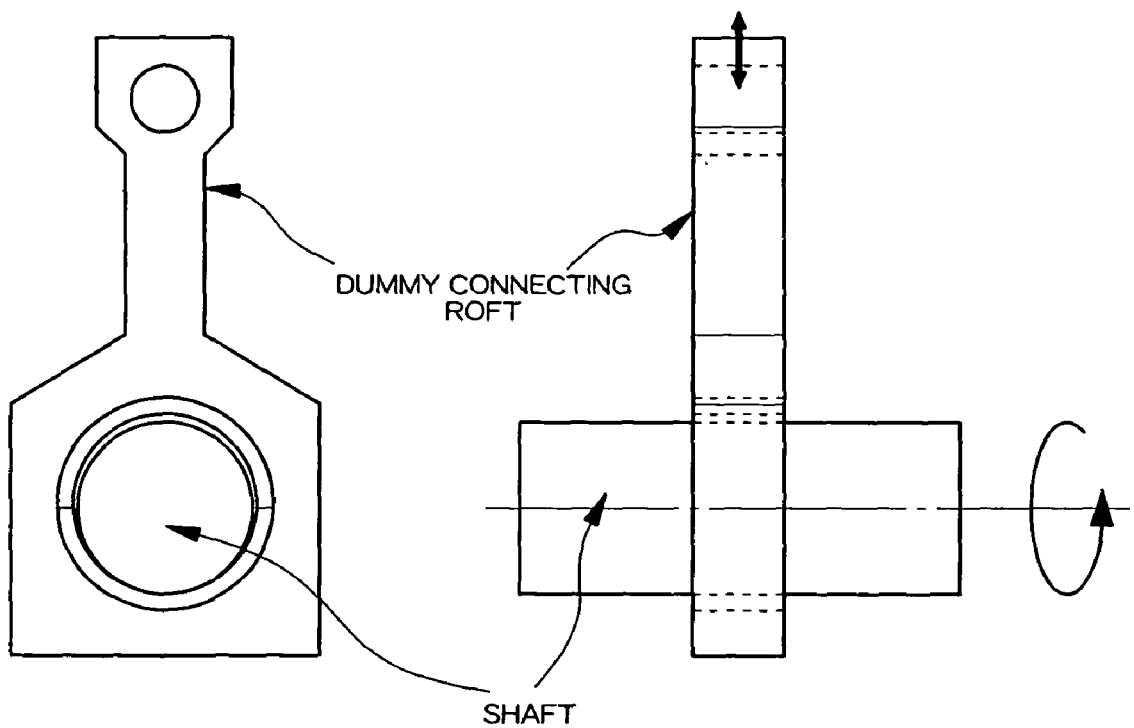
FIG. 5 shows an outline of a test method in a fatigue test using dynamic load according to an embodiment of the present invention.

A fatigue test using dynamic load was conducted using a dummy connecting rod to evaluate fatigue performance of a bearing portion in the molded connecting rods experimentally manufactured in Examples 1 and 2. FIG. 5 shows an outline of a method for the fatigue test using dynamic load. In the fatigue test, a shaft which is the object to be fitted was inserted into the dummy connecting rod, and was rotated at a rotation speed of 3000 rpm. The dummy connecting rod, being the molded connecting rod, was moved up and down while the shaft was rotated, to thereby impart a predetermined bearing stress on the bearing portion. One rotation of the shaft was defined as one repetition. A load for vertically moving the dummy connecting rod was $5 \times 10^4$ N~$7 \times 10^4$ N, and the thickness of the dummy connecting rod was 17 mm. A material of the shaft, being the object to be fitted, was quenched S55C carbon steel for machine construction, and the shaft was formed so as to have a diameter of 42 mm. Further, the fatigue test was conducted in oil at an oil temperature of 160° C. using 10W-30CD as oil. Another bearing was formed in another molded connecting rod by plasma spraying, to enable comparison between the bearings formed in Examples 1 and 2 and this additional bearing formed by plasma spraying. Alloy powders used for forming the bearing by plasma spraying were a Cu—Sn—Ag alloy powder containing 8 wt % of Sn and 1 wt % of Ag, and an Al—Sn—Si alloy powder containing 12 wt % of Sn and 3 wt % of Si.

Figure 6:
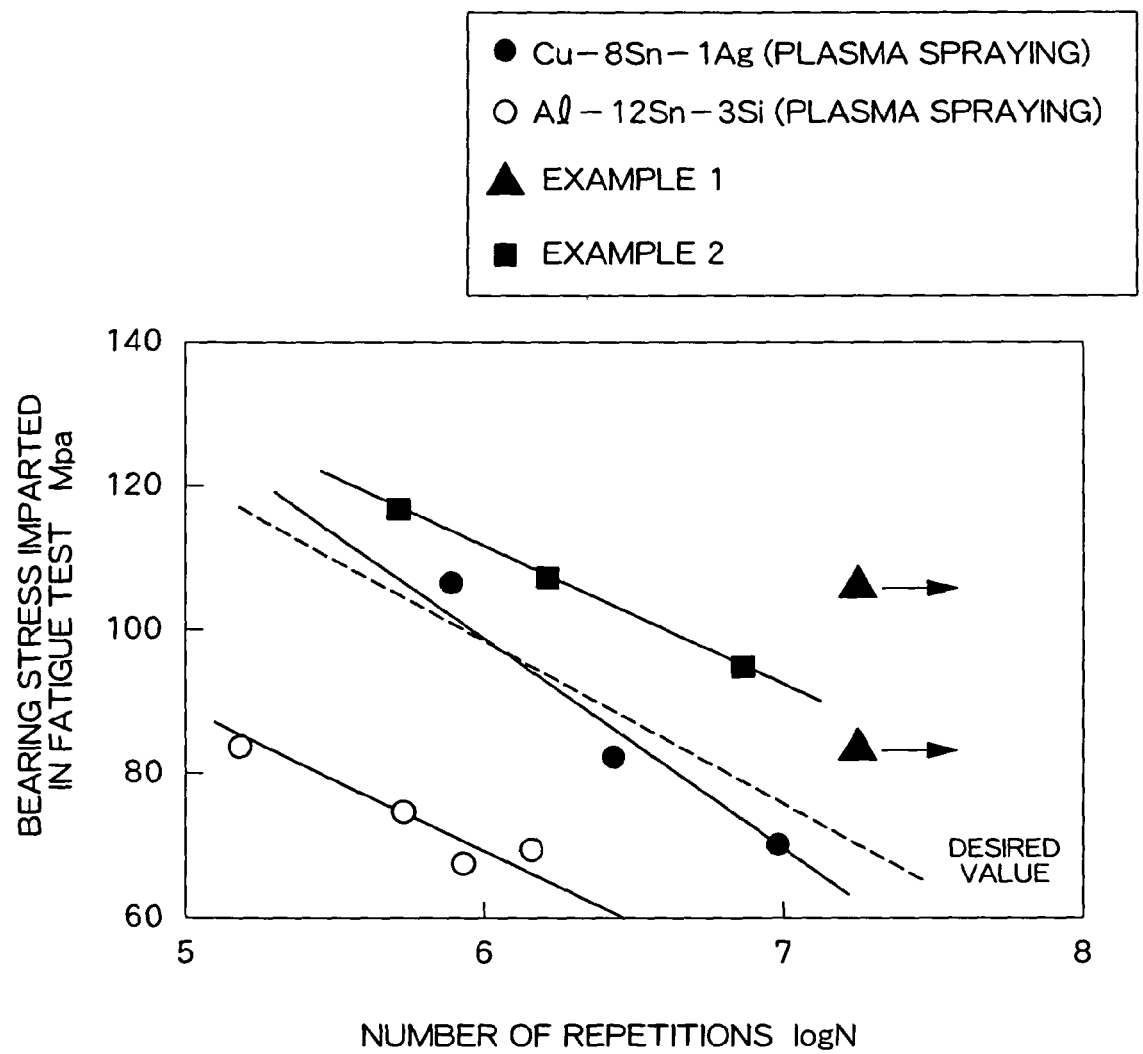
FIG. 6 shows results of a dynamic load fatigue test performed as outlined in FIG. 5.

FIG. 6 shows the result of the fatigue test using dynamic load. In FIG. 6, bearing stresses applied in the fatigue test are plotted in the ordinate, and the numbers of repetitions are plotted in the abscissa, to indicate the number of repetitions performed until fatigue breaking occurs due to loading of a predetermined bearing stress. Further, black circles represent values obtained for plasma spraying of the Cu—Sn—Ag alloy powder, white circles represent values obtained for plasma spraying of the Al—Sn—Si alloy powder, black triangles represent values for Example 1, black squares represent values for Example 2, and a broken line represents desired values for fatigue performance. The bearings experimentally manufactured in the molded connecting rods in Examples 1 and 2 exhibit superior fatigue performance to those of the bearings in the molded connecting rods obtained by coating the bearing materials through plasma spraying. Moreover, both of the bearings in the molded connecting rods experimentally manufactured in Examples 1 and 2 surpassed the desired values.

EXAMPLE 4

A seizure test was conducted with respect to the Sn-containing Cu alloy powder and the Sn-containing Al alloy powder while varying the content of Sn as an alloy component, to evaluate anti-seizing properties. An alloy powder containing 1 wt % of Ag was used for the Sn-containing Cu alloy powder, while a powder including 5 wt % of $Al_2O_3$ as a hard material was used for the Sn-containing Al alloy powder. The alloy powders being the bearing material were coated to form a coating of the bearing material by the above-described cold gas dynamic spraying according to the bearing material coating step (S14).

Figure 7A:
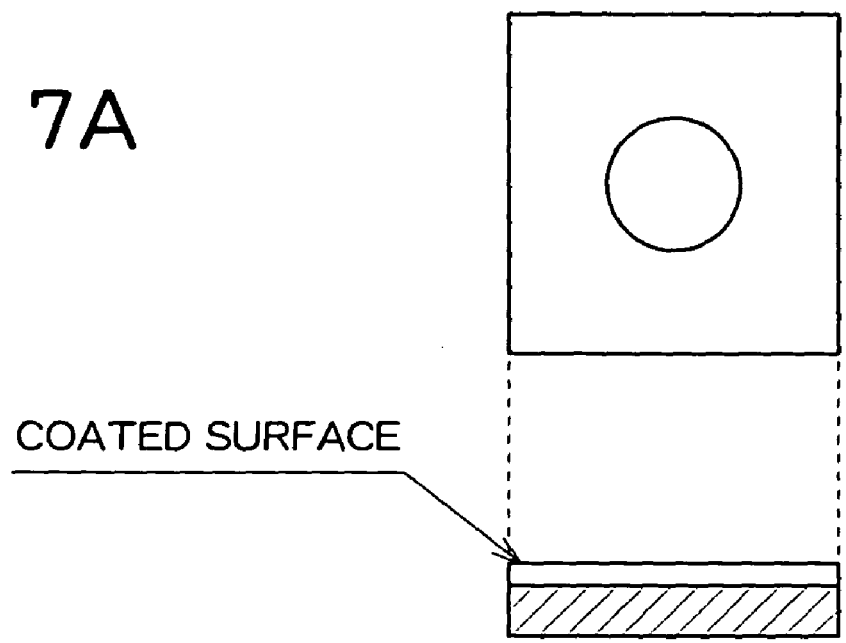
FIG. 7A is a schematic diagram showing a shape of a flat-plate test piece used for a seizure test conducted in accordance with a method specified by a mechanical test laboratory.
Figure 7B:
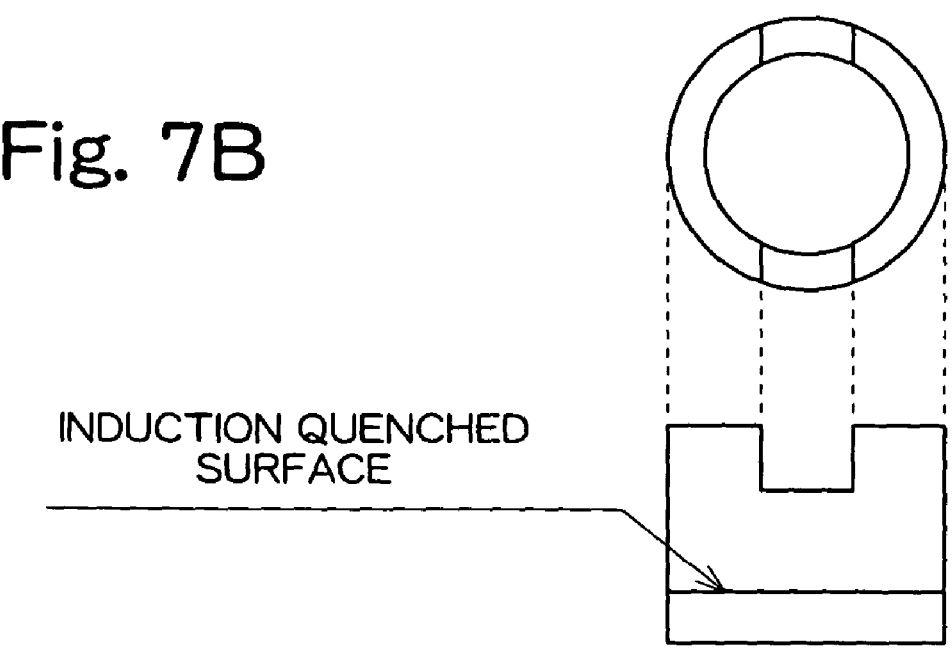
FIG. 7B is a schematic diagram showing a shape of a ring test piece used in conjunction with the seizure test conducted in accordance with a method specified by a mechanical test laboratory.

The seizure test was performed according to a method defined by a mechanical test laboratory. FIGS. 7A to 7E are diagrams schematically representing an outline of the seizure test conducted in accordance with the method specified by the mechanical test laboratory. A flat-plate test piece shown in FIG. 7A is composed of S45C carbon steel for machine construction and coated on one surface with the alloy powder of the bearing material. The flat-plate test piece has dimensions of 30 mm×30 mm in length by width and 5 mm in thickness. An area having a diameter of 11 mm having no alloy powder of the bearing material coated thereon was provided at the approximate center of the flat-plate test piece. A ring test piece shown in FIG. 7B is composed of an induction-quenched material of SVdh45. The ring test piece has dimensions of 25.6 mm in outside diameter, 20 mm in inside diameter, and 15 mm in height. The seizure test of mechanical test laboratory type was performed in a state wherein the bearing material coated surface of the flat-plate test piece was physically contacted with the ring test piece in oil as shown in FIG. 7C. Then, as shown in FIG. 7D, 250 N of load was applied every two minutes while rotating the ring test piece at a rotation speed of 1000 rpm, to measure a seizing load which causes seizing between the ring test piece and the flat-plate test piece. Here, the seizure test of the mechanical test laboratory type was conducted under the test conditions shown in FIG. 7E.

Figure 8:
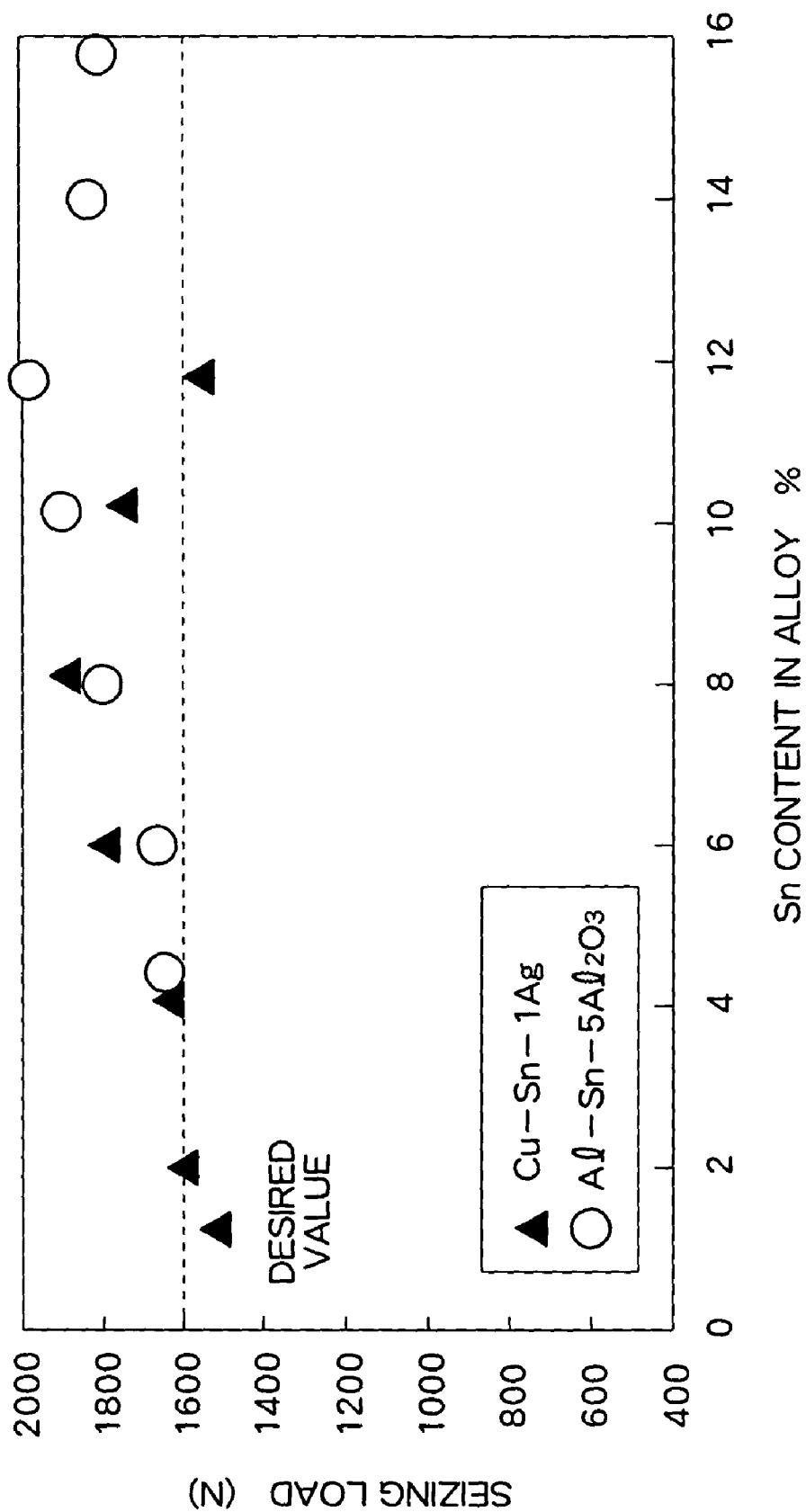
FIG. 8 is a diagram showing results of a the seizure test conducted in accordance with the method specified by the mechanical test laboratory.

FIG. 8 shows the result of the seizure test conducted in accordance with the method specified by the mechanical test laboratory. In FIG. 8, seizing loads are plotted on the ordinate, and Sn content of the alloy powder are plotted on the abscissa to depict the seizing loads measured against the content of Sn being an alloy component. Further, black triangles in FIG. 8 represent the Cu—Sn—1Ag powder, white circles represent Al—Sn—5Al$_2$O$_3$ powder, and a broken line represents desired values for the anti-seizing property. Among the tested Sn-containing Cu alloy powders, the desired anti-seizing property was obtained when the Sn content was within a range of from 2 wt % to 10 wt %. When the Sn content was within the range of from 5 wt % to 10 wt %, a superior anti-seizing property was obtained. On the other hand, regarding the Sn-containing Al alloy powder, the desired anti-seizing property was obtained when the Sn content was within a range of from 4 wt % to 16 wt %, and a superior anti-seizing property was obtained when the Sn content was within a range of from 8 wt % to 16 wt %. It should be noted, when the Sn content exceeded 16 wt %, seizing occurred even with a smaller seizing load.

EXAMPLE 5

Bearing material coatings were manufactured while varying the amount of added Al$_2$O$_3$ powder used as a hard material, to conduct fatigue tests using dynamic load on the bearing materials in which an Al$_2$O$_3$ powder of a hard material was added to the Al powder alloy containing Sn. The fatigue test was performed using molded connecting rods in a manner similar to that employed in the above-described fatigue test using dynamic load. As bearing stresses applied in the fatigue test, bearing stresses applied at $10^7$ repetitions were obtained from an S—N curve of the fatigue test using dynamic load.

Figure 9:
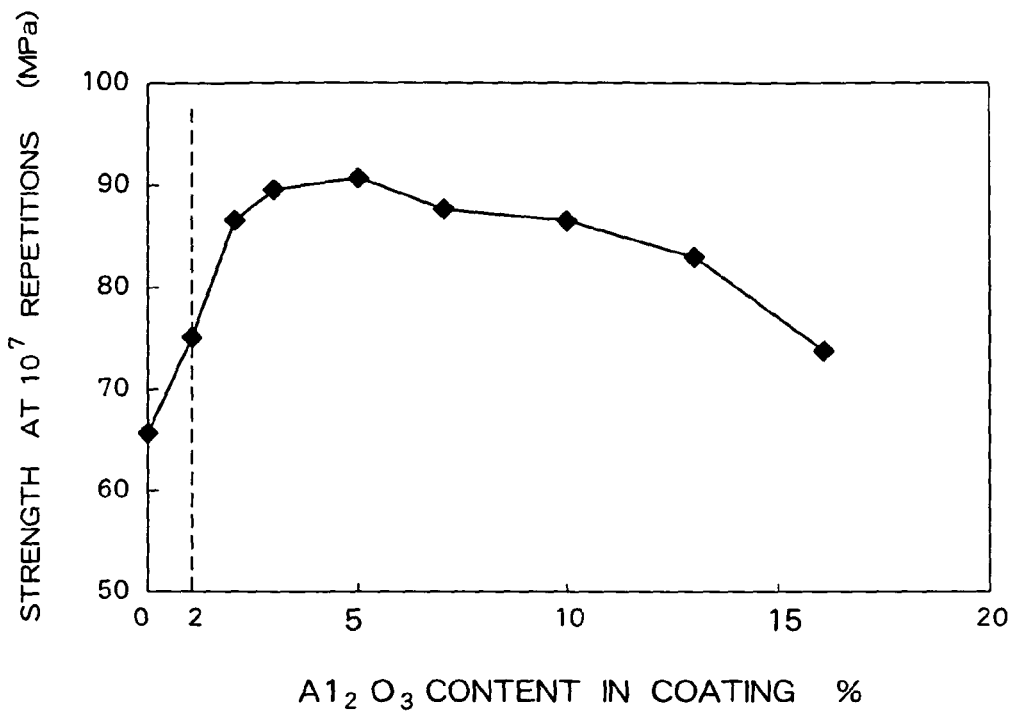
FIG. 9 shows a relationship between $Al_2O_3$ content and fatigue strength of test materials produced according to an embodiment of the present invention.

FIG. 9 shows the relationship between the addition amounts of the Al$_2$O$_3$ powder and fatigue strengths. In FIG. 9, the bearing stresses applied at $10^7$ repetitions in the fatigue test are plotted on the ordinate, and the addition amounts of the Al$_2$O$_3$ powder are plotted on the abscissa, to represent fatigue strengths against the bearing stresses applied at $10^7$ repetitions in the fatigue test with respect to varying addition amounts of the Al$_2$O$_3$ powder. The test results revealed that fatigue resistance was increased by adding a range of from 2 wt % to 15 wt % of the Al$_2$O$_3$ powder. Further, when the amount of added Al$_2$O$_3$ powder fell within a range of from 3 wt % to 7 wt %, superior fatigue resistance was obtained. Because the Al$_2$O$_3$ powder becomes more prone to agglomerate as the addition amount of the Al$_2$O$_3$ powder increases, an excessive addition of the Al$_2$O$_3$ powder causes the coating to be cracked easily, resulting in degradation of fatigue resistance.

EXAMPLE 6

A test for evaluating influence on a degree of bearing wear was conducted on the Sn-containing Al alloy powder while varying the addition amount of the Al$_2$O$_3$ powder. The test was performed according to the above-described seizure test conducted in accordance with the method specified by the mechanical test laboratory shown in FIGS. 7A to 7E. The degree of bearing wear was calculated from weights of the flat-plate test piece on which the alloy powder and others of the bearing material are coated, the weights being measured prior to and subsequent to the seizure test. Therefore, the degree of bearing wear is an indicator showing changes of bearing wear that progressed in the seizure test.

Figure 10:
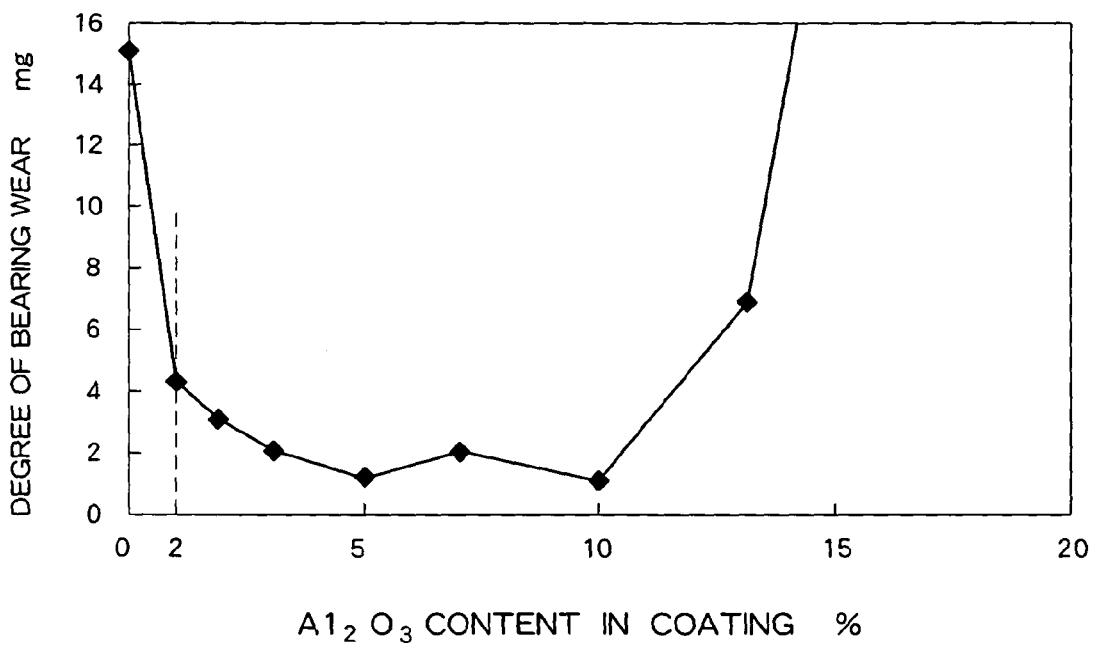
FIG. 10 shows a relationship between $Al_2O_3$ content and degrees of bearing wear of test materials produced according to the embodiment of the present invention.
Figure 11:
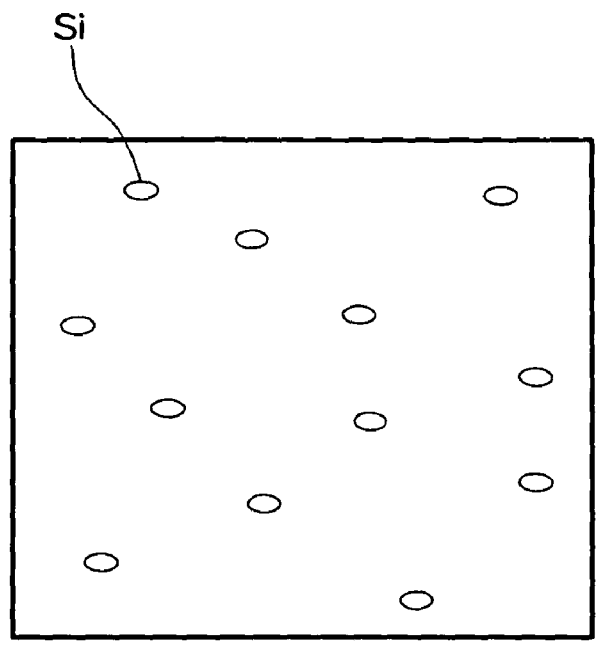
FIG. 11 is a schematic diagram showing a metallographic structure of a bearing composed of an Al—Sn—Si alloy as an example of an aluminum alloy manufactured by casting and rolling a metallic material.
Figure 12:
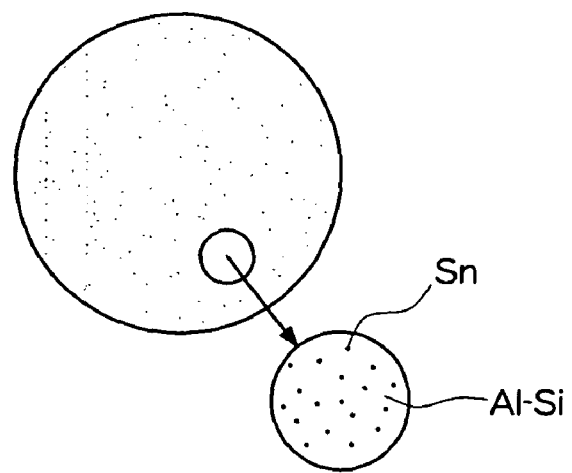
FIG. 12 is a schematic diagram showing a metallographic structure of an Al—Sn—Si alloy powder thermal spray material used for manufacturing a bearing composed of the Al—Sn—Si alloy by means of thermal spraying.
Figure 13:
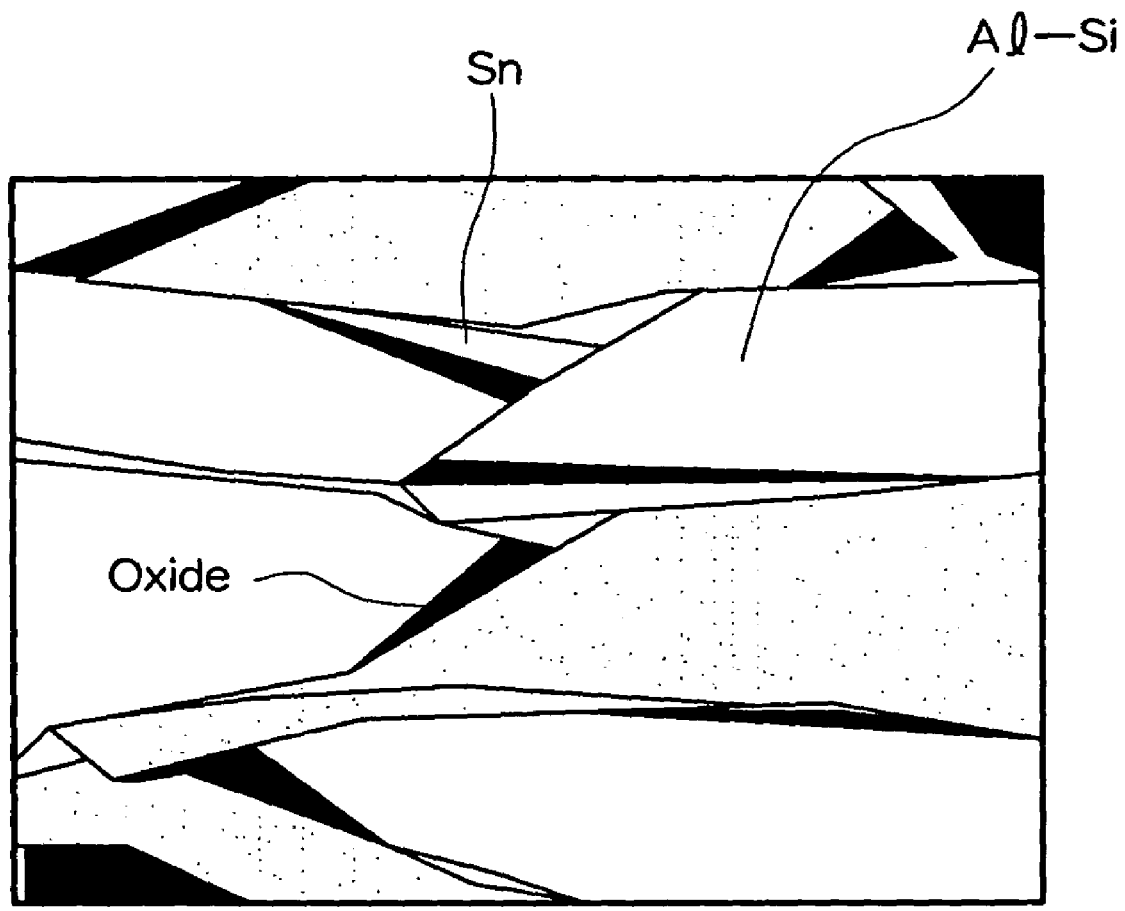
FIG. 13 is a schematic diagram showing a metallographic structure of a bearing coating composed of an Al—Sn—Si alloy formed by thermal spraying using the Al—Sn—Si alloy powder shown in FIG. 12.

FIG. 10 shows a relationship between the amounts of added Al$_2$O$_3$ powder and the degrees of bearing wear. In FIG. 10, the degrees of bearing wear are plotted on the ordinate, and the addition amounts of the Al$_2$O$_3$ powder are plotted on the abscissa, to indicate the degrees of bearing wear relative to the varying addition amounts of Al$_2$O$_3$ powder. The degrees of bearing wear declines when the addition amount of the Al$_2$O$_3$ powder is within a range of from 2 wt % to 10 wt %. On the other hand, when the addition amount of the Al$_2$O$_3$ powder exceeds 10 wt %, even the shaft being the mating object starts to wear, which in turn causes the bearing to further wear away due to particles generated by the grinding action of the worn shaft.

What is claimed is:

1. A method for manufacturing a bearing material coated slide member wherein a bearing material is coated on a sliding surface of a slide member comprising:
    a bearing material coating step for forcing the bearing material to impact on the sliding surface in a state in which the bearing material is maintained in a solid phase, to form a bearing material coated layer; wherein
    the bearing material includes an Al alloy powder containing from 4 wt % to 16 wt % of Sn and from 84 wt % to 96 wt % of Al.

2. The method for manufacturing a bearing material coated slide member according to claim 1, wherein
    the Al alloy powder contains from 8 wt % to 16 wt % of Sn.

3. The method for manufacturing a bearing material coated slide member according to claim 2, wherein
    the bearing material includes a predetermined hard material.

4. The method for manufacturing a bearing material coated slide member according to claim 1, wherein
    the bearing material includes a predetermined hard material.

5. The method for manufacturing a bearing material coated slide member according to claim 4, wherein
    the predetermined hard material is composed of at least one material selected from the group comprising Al$_2$O$_3$, SiC, AlN, Fe—C, Mo$_2$C, Ni—B, Fe—Mo, and Fe—P.

6. The method for manufacturing a bearing material coated slide member according to claim 5, wherein
    the predetermined hard material is Al$_2$O$_3$.

7. The method for manufacturing a bearing material coated slide member according to claim 6, wherein
    the content of the Al$_2$O$_3$ is from 2 wt % to 10 wt %.

* * * * *